(12) United States Patent
Hollar, Jr.

(10) Patent No.: US 6,376,794 B1
(45) Date of Patent: Apr. 23, 2002

(54) PERCUSSIVE ARC WELDING APPARATUS

(75) Inventor: Donald L. Hollar, Jr., Overland Park, KS (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/703,900

(22) Filed: Nov. 2, 2000

(51) Int. Cl.[7] .................................................. B23K 9/22
(52) U.S. Cl. ......................................................... 219/95
(58) Field of Search ...................... 219/95, 96

(56) References Cited

U.S. PATENT DOCUMENTS

| | | | | |
|---|---|---|---|---|
| 2,510,101 A | * | 6/1950 | Graham ........................ | 219/95 |
| 2,685,630 A | * | 8/1954 | Graham ........................ | 219/95 |
| 3,325,621 A | * | 6/1967 | Conrad ........................ | 219/95 |

* cited by examiner

*Primary Examiner*—Clifford C. Shaw
(74) *Attorney, Agent, or Firm*—James C. Durkis; Dickson G. Kehl; Virginia B. Caress

(57) ABSTRACT

A percussive arc welding apparatus includes a generally cylindrical actuator body having front and rear end portions and defining an internal recess. The front end of the body includes an opening. A solenoid assembly is provided in the rear end portion in the internal recess of the body, and an actuator shaft assembly is provided in the front end portion in the internal recess of the actuator body. The actuator shaft assembly includes a generally cylindrical actuator block having first and second end portions, and an actuator shaft having a front end extending through the opening in the actuator body, and the rear end connected to the first end portion of the actuator block. The second end portion of the actuator block is in operational engagement with the solenoid shaft by a non-rigid connection to reduce the adverse rebound effects of the actuator shaft. A generally transversely extending pin is rigidly secured to the rear end of the shaft. One end of the pin is received in a slot in the nose housing sleeve to prevent rotation of the actuator shaft during operation of the apparatus.

15 Claims, 2 Drawing Sheets

PERCUSSIVE ARC WELDING APPARATUS

This invention was made with Government support under contract No. DE-AC04-76DP00613 awarded by the U.S. Department of Energy. The Government has certain rights in the invention.

FIELD AND HISTORICAL BACKGROUND OF THE INVENTION

The present invention is directed to a welding apparatus, and more particularly to a percussive arc welding apparatus. In the electrical/electronic product assembly, the use of percussive arc welding to join, for example, electrical conductors, is common. Percussive arc welding is accomplished by initiating an electric arc between the two components being joined, and then forging the components together after the arc has melted the adjacent surfaces of the components. Typical applications include welding electrical wires, in the size range of No. 20 AWG to No. 26 AWG, to electrical housing and connector contacts.

A critical component of the percussive arc welding system is the actuator that provides a precise and consistent forging action. The actuator must also conduct the electrical welding current while isolating the high voltage arc initiating pulse from other external circuits and fixtures. The actuator drive mechanism must have low mass, relative to the components being welded, in order to minimize the "rebound" after the forging impact.

Various devices are currently available for use in percussive arc welding of the components of interest. These devices, however, suffer from the disadvantage that the actuator has a high mass relative to the component being welded. This results in undesirable "rebound" after the forging impact, which not only adversely effects the forging action, but also may even damage the components being forged.

Therefore, there is a need in the industry for a percussive arc welding apparatus in which the detrimental effects of rebound are significantly reduced or eliminated.

OBJECTS AND SUMMARY OF THE INVENTION

The principal object of the present invention is to provide a percussive arc welding apparatus that overcomes the rebound drawbacks associated with conventional percussive arc welding devices.

Yet another object of the present invention is to provide a percussive arc welding apparatus which significantly reduces or eliminates adverse effects of actuator rebound on the components being forged.

Still yet another object of the present invention is to provide a percussive arc welding apparatus which provides precise and consistent forging of the components.

An additional object of the present invention is to provide a percussive arc welding apparatus in which the effects of the actuator rebound are further mitigated by a resilient member positioned between the solenoid and the movable actuator rod holding block.

Yet an additional object of the present invention is to provide a percussive arc welding apparatus in which a resilient member located between the solenoid and the movable actuator rod holding block, partially absorbs the shock upon impact.

Still yet an additional object of the present invention is to provide a percussive arc welding apparatus which provides excellent high voltage isolation between the actuator shaft and the solenoid.

A further object of the present invention is to provide a percussive arc welding apparatus in which the actuator shaft mass is significantly reduced by providing a non-rigid connection between the actuator shaft and the solenoid to significantly reduce or eliminate the adverse effects of the actuator rod rebound during the forging action.

Yet a further object of the present invention is to provide a percussive arc welding apparatus which is simple in design, significantly less complex than the conventional devices, and uses inexpensive commercially available hardware.

In summary, the main object of the present invention is to provide a percussive arc welding apparatus which significantly reduces or eliminates the adverse effects of the actuator rebound during the forging action, provides excellent high voltage isolation, is simple in design and relatively inexpensive to manufacture.

In accordance with the present invention, a percussive arc welding apparatus includes a generally cylindrical actuator body having front and rear end portions and defining an internal recess. The front end of the body includes an opening. A solenoid assembly is provided in the rear end portion in the internal recess of the body, and an actuator shaft assembly is provided in the front end portion in the internal recess of the actuator body. The actuator shaft assembly includes a generally cylindrical actuator block having first and second end portions, and an actuator shaft having a front end extending through the opening in the actuator body, and the rear end connected to the first end portion of the actuator block. The second end portion of the actuator block is in operational engagement with the solenoid shaft by a non-rigid connection to reduce the adverse rebound effects of the actuator shaft. A generally transversely extending pin is rigidly secured to the rear end of the shaft. One end of the pin is received in a slot in the nose housing sleeve to prevent rotation of the actuator shaft during operation of the apparatus.

BRIEF DESCRIPTION OF THE DRAWINGS

The above and other objects, novel features and advantages of the present invention will become apparent from the following detailed description of the invention as illustrated in the drawings, in which.

DETAILED DESCRIPTION OF THE INVENTION

The percussive arc welding apparatus WA of the present invention is in the form of a generally cylindrical actuator body 10 including front and rear end portions 12 and 14. The actuator body 10 includes various peripheral openings 16 to provide access to the components located therein.

Figure 1:
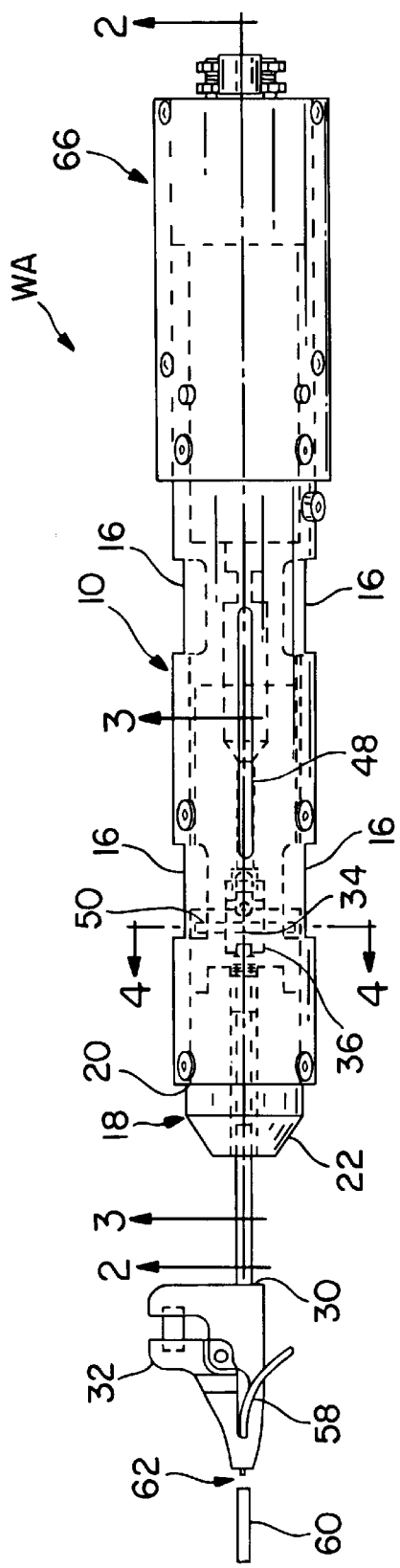
FIG. 1 is a perspective view of the percussive arc welding apparatus of the present invention.
Figure 3:
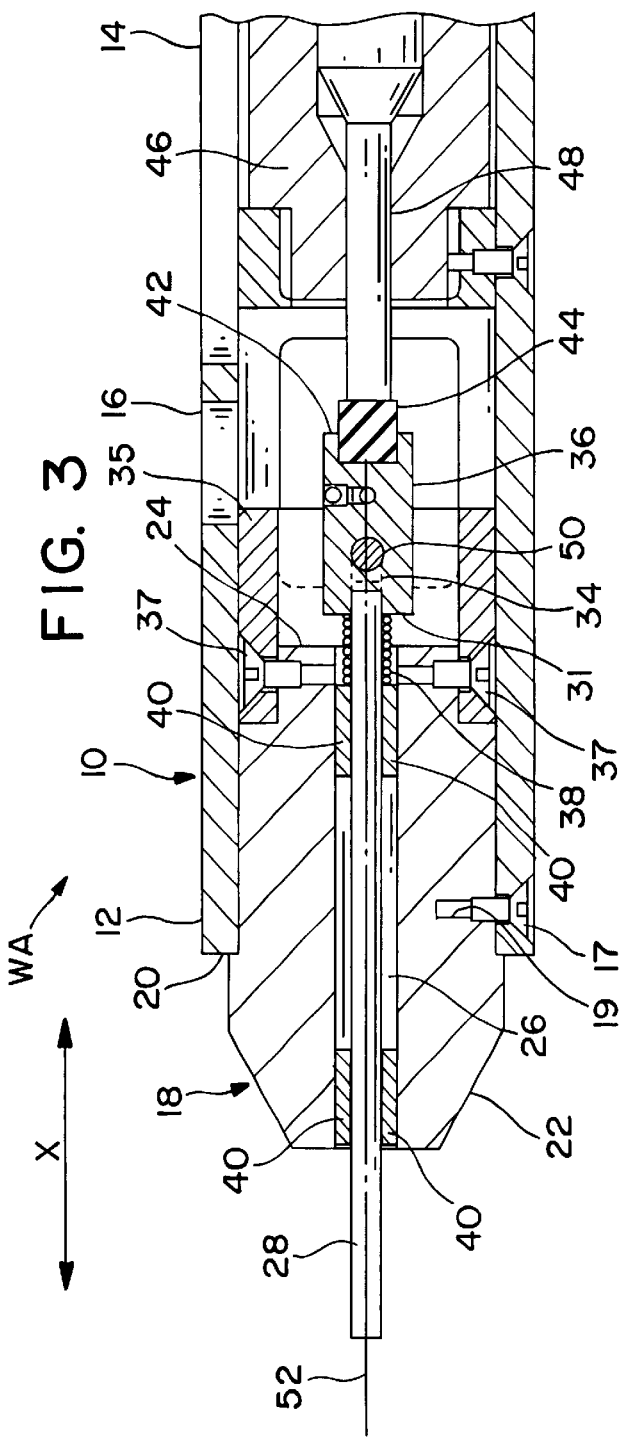
FIG. 3 is an enlarged sectional view taken along line 3—3 of FIG. 1.

As best shown in FIGS. 1 and 3, a generally cylindrical nose housing 18 extends through the opening 20 in the front end portion 12 and is immovably secured to the body 10 by screw 17 extending into a radial slot 19.

The nose housing 18 includes a generally tapered front-end portion 22, a rear end portion 24, and a central bore 26 for receiving an actuator rod or shaft 28 therein. The front end 30 of the shaft 28 is in operational engagement with a wire holding jaw assembly 32 (FIG. 1), and the rear end 34 thereof is rigidly connected to a movable actuator block 36 (FIG. 3).

As best shown in FIG. 3, the front end portion 31 of the actuator block 36 is biased against the rear end portion 24 of the nose housing 18 by a spring 38. In FIG. 3, conventional bushings 40 are placed between the actuator shaft 28 and the bore 26.

Figure 4:
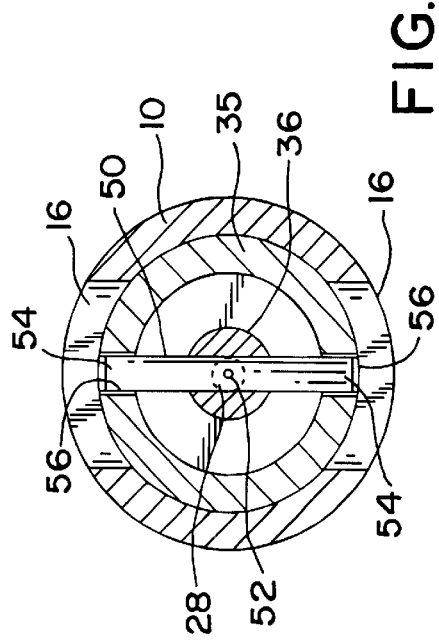
FIG. 4 is an enlarged sectional view taken along line 4—4 of FIG. 1.

A nose housing sleeve 35 is provided adjacent the rear end portion 24 of the nose housing 18 and is rigidly connected thereto by conventional fasteners 37. As best shown in FIG. 4, the external diameter of the nose housing sleeve 35 is selected such that it frictionally engages the internal diameter of the actuator body 10.

The rear end portion 42 of the actuator block 36 includes a rubber bushing 44, preferably made of polyurethane, to electrically isolate the actuator block 36 from a solenoid assembly 46.

Figure 2:
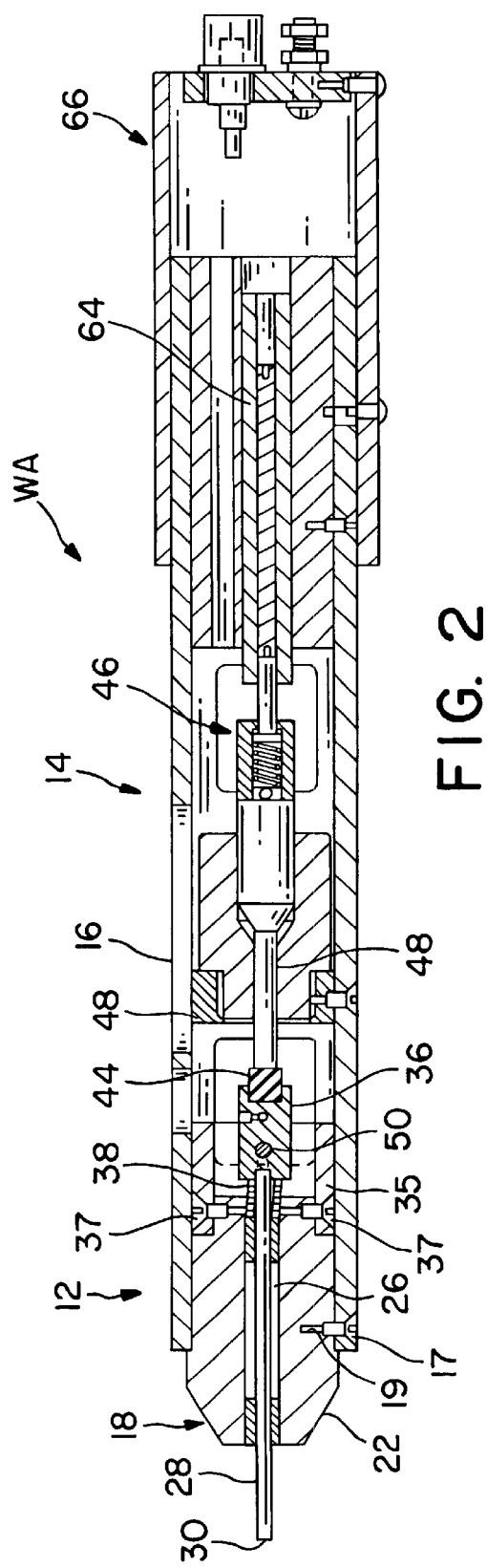
FIG. 2 is a sectional view taken along line 2—2 of FIG. 1.

As best shown in FIGS. 2 and 3, the solenoid assembly 46 is provided in the rear end portion 14 of the body 10, and includes a solenoid shaft 48 in frictional engagement with the rubber bushing 44.

In order to prevent a rotational movement of the actuator shaft 28 during forging or welding, a pin 50 extends through the actuator block 36 and is rigidly connected to the rear end 34 of the actuator shaft 28 (FIGS. 1 and 4). The pin 50 extends through the actuator block 36 and is positioned generally transverse or at right angle to the longitudinal axis 52 of the actuator shaft 28 (FIGS. 3 and 4).

As best shown in FIG. 4, the ends 54 of the pin 50 are received in a vertical slot 56 of the nose housing sleeve 35. Thus, while the actuator shaft 28 is free to translate axially along a direction shown by arrow X in FIG. 3, it is prevented from rotating about its longitudinal axis 52, since the pin 50 is captured in the vertical slot 56. The anti-rotation feature of the actuator shaft 28 is an important and necessary feature because some welding applications use wire holding jaws that hold the wire offset from the central longitudinal axis (52) of the actuator shaft. Any rotation of actuator rod or shaft would displace the wire radially from the welding target.

In FIG. 1, a wire and a connector pin are designated by reference numerals 58 and 60, respectively, and the location of arc is shown by reference numeral 62. In FIG. 2, a velocity transducer is shown by reference numeral 64, and the external support housing is shown by reference numeral 66.

As can be readily observed from the above, since the actuator 28 and the solenoid assembly 46 are not rigidly connected to each other, upon actuator 28 impact during the welding process, the solenoid shaft 48 rebounds freely away from the actuator shaft 28. In view of the non-rigid connection between the actuator shaft 28 and the solenoid assembly 46, the rebound mass of the overall assembly is significantly reduced leading to significant reduction or elimination of adverse rebound effects on the components being welded.

Moreover, the rubber bushing 44 also provides some shock absorbing effect upon impact, in addition to electrically isolating the actuator shaft 28 from the solenoid assembly 46.

While this invention has been described as having preferred ranges, steps, materials, or designs, it is understood that it is capable of further modifications, uses and/or adaptations following in general the principle of the invention, and including such departures from the present disclosure, as those come within the known or customary practice in the art to which the invention pertains and as may be applied to the central features hereinbefore set forth, and fall within the scope of the invention and of the appended claims.

What is claimed is:

1. A percussive arc welding apparatus, comprising:
   a) a generally cylindrical actuator body having first and second end portions and defining an internal recess;
   b) said first end portion of said body including an opening;
   c) a solenoid assembly positioned in said second end portion in the internal recess of said actuator body;
   d) said solenoid assembly including a solenoid shaft;
   e) an actuator shaft assembly positioned in said first end portion in the internal recess of said actuator body;
   f) said actuator shaft assembly including a generally cylindrical actuator block having first and second end portions, and an actuator shaft having a first end extending through the opening in said actuator block and a second end connected to the first end portion of said actuator block.

2. The welding apparatus of claim 1, wherein said resilient member comprises a rubber bushing.

3. The welding apparatus of claim 1, wherein said actuator block and said solenoid shaft are electrically separated of the bushing.

4. The welding apparatus of claim 1, further compromising an anti-rotation means for preventing rotation of said actuator during apparatus of the apparatus, said anti-rotation means comprising a pin rigidly mounted to said actuator shaft adjacent to said second end of said actuator shaft.

5. The welding apparatus of claim 4, wherein said pin extends generally transverse to said actuator shaft.

6. The welding apparatus of claim 5, wherein at least one end of said pin is slidably received in a slot provided in said actuator body.

7. The welding apparatus of claim 1, further comprising:
   a) a nose housing positioned in said first end portion in the internal recess of said actuator body;
   b) said nose housing including a front end portion extending through the opening in said actuator body and a rear end portion positioned adjacent said actuator block; c) a nose housing sleeve positioned adjacent said rear end portion; and d) said nose housing sleeve including a slot.

8. The welding apparatus of claim 7, further comprising a pin member rigidly mounted to said actuator shaft and extending generally transversely thereto.

9. The welding apparatus of claim 8, wherein:
   a) one end of said pin member is slidably received in said slot; and
   b) said actuator shaft, while axially translatable, is prevented from rotating in a circular direction when the apparatus is operated.

10. A percussive arc welding apparatus, comprising:
    a) a generally cylindrical actuator body having front and rear end portions and defining an internal recess;
    b) said front end portion of said body including an opening;
    c) a solenoid assembly positioned in said rear end portion in the internal recess of said actuator body;
    d) said solenoid assembly including a solenoid shaft e) an actuator shaft assembly positioned in said front end portion in the internal recess of said actuator body;

f) said actuator shaft assembly including a generally cylindrical actuator block having first and second end portions, and an actuator shaft having a front end extending through the opening in said actuator body and a rear end connected to the first end portion of said actuator block;

g) said second end portion of said actuator block being in operational engagement with said solenoid shaft by a non-rigid connection to reduce the rebound effects of said actuator shaft; and h) an anti-rotation means for preventing rotation of said actuator shaft during operation of the apparatus comprising a pin rigidly mounted to said actuator shaft adjacent to said second end of said actuator shaft.

11. The welding apparatus of claim 10, wherein said pin extends generally transverse to said actuator shaft.

12. The welding apparatus of claim 11, wherein at least one end of said pin is slidably received in a slot provided in said actuator body.

13. The welding apparatus of claim 10, wherein a resilient member is disposed between said second and portion of said actuator block and said solenoid shaft.

14. The welding apparatus of claim 13, wherein said resilient member comprises a rubber bushing.

15. The welding apparatus of claim 10, wherein said actuator block and said solenoid shaft are electrically isolated by a rubber bushing.

* * * * *